United States Patent
Bahnes

(10) Patent No.: US 12,305,030 B2
(45) Date of Patent: May 20, 2025

(54) COMPOSITE MATERIAL, EXTRUDATE AND EXTRUSION PROCESS

(71) Applicant: Salamander Industrie-Produkte GmbH, Türkheim (DE)

(72) Inventor: Hermann Bahnes, Papenburg (DE)

(73) Assignee: Salamander Industrie-Produkte GmbH, Türkheim (DE)

( * ) Notice: Subject to any disclaimer, the term of this patent is extended or adjusted under 35 U.S.C. 154(b) by 785 days.

(21) Appl. No.: 17/267,436

(22) PCT Filed: Aug. 9, 2019

(86) PCT No.: PCT/EP2019/071494
§ 371 (c)(1),
(2) Date: Feb. 9, 2021

(87) PCT Pub. No.: WO2020/030809
PCT Pub. Date: Feb. 13, 2020

(65) Prior Publication Data
US 2021/0403695 A1    Dec. 30, 2021

(30) Foreign Application Priority Data

Aug. 9, 2018  (DE) .................. 102018119427.7
Dec. 10, 2018  (EP) .................... 18211378

(51) Int. Cl.
*C08L 27/06*    (2006.01)
*B29C 48/00*    (2019.01)
*C08K 3/04*    (2006.01)
*C08K 5/00*    (2006.01)
*C08K 11/00*    (2006.01)
*C08L 23/286*    (2025.01)
*B29K 27/06*    (2006.01)
*C08K 3/08*    (2006.01)
*C08K 3/22*    (2006.01)

(52) U.S. Cl.
CPC ............ *C08L 27/06* (2013.01); *B29C 48/022* (2019.02); *C08K 5/005* (2013.01); *C08K 11/00* (2013.01); *C08L 23/286* (2013.01); *B29K 2027/06* (2013.01); *C08K 3/04* (2013.01); *C08K 2003/0818* (2013.01); *C08K 2003/0893* (2013.01); *C08K 2003/2241* (2013.01); *C08K 2003/2272* (2013.01)

(58) Field of Classification Search
CPC ........ C08L 27/06; C08L 23/286; C08L 97/02; B29C 48/022; B29C 48/07; B29C 48/11; C08K 5/005; C08K 11/00; C08K 3/04; C08K 2003/0818; C08K 2003/0893; C08K 2003/2241; C08K 2003/2272; B29K 2027/06; B29K 2105/0005; B29K 2105/12; B29K 2105/16; B29K 2311/10; B29K 2509/00; B29K 2511/10; B29L 2007/002; B29L 2024/006; B29L 2031/60
See application file for complete search history.

(56) References Cited

U.S. PATENT DOCUMENTS 7,582,694 B2    9/2009 Jiang et al.
2005/0256231 A1 *  11/2005 Jiang ................ C08L 23/06
                                                            524/9
2006/0100318 A1    5/2006 Williams et al.

FOREIGN PATENT DOCUMENTS

DE    60318617 T2    1/2009
EP    1327663 A1 *   7/2003    ........... B65D 65/466
EP    1831311 B1    5/2008
WO    2004022846 A2    3/2004
WO    2015/063365 A1    5/2015

OTHER PUBLICATIONS

German Action dated Aug. 21, 2018, Application No. 10 2018 119 427.7.
PCT International Search Report dated Oct. 25, 2019, Application No. PCT/EP2019/071494.
Jan Schut: "First Commercial Applications for Three New 'Eco' Fillers", The Plastics Engineering Blog, Sep. 16, 2010 (Sep. 16, 2010), pp. 1-5, XP055597523, Ridgetown, Canada; http://www.omtecinc.ca/docs/news_2010-1.pdf [obtained on Jun. 18, 2019].

* cited by examiner

*Primary Examiner* — K. Boyle
(74) *Attorney, Agent, or Firm* — Banner & Witcoff Ltd.

(57) ABSTRACT

A composite material for producing an extrudate may include: PVC and granules of cereal chaff. The granules of cereal chaff may include spelt, hulls, granules, seed coats and/or stem parts. The cereal may be Pooideae and/or Panicoideae and/or Andropogonoide-ae.

19 Claims, 1 Drawing Sheet

COMPOSITE MATERIAL, EXTRUDATE AND EXTRUSION PROCESS

CROSS REFERENCE TO RELATED APPLICATIONS

This patent application is a United States National Stage Application of International Application No. PCT/EP2019/071494, filed Aug. 9, 2019, which claims priority to German Patent Application No. 102018119427.7, filed Aug. 9, 2018, and European Patent Application No. 18211378.7, filed Dec. 10, 2018. Each of these applications is incorporated herein by reference in its entirety.

BACKGROUND

Field

The present disclosure relates to a composite material for producing an extrudate, in particular an imitation wood. Further, the disclosure relates to an extrudate, such as an imitation wood, produced by extrusion of a composite material. Further, the present disclosure provides a method for producing a composite material and an extrusion method for producing an extrudate of a composite material.

Related Art

Composite materials of this type are used, for example, in profile extrusion for the manufacture of profiles for floor or wall paneling or fencing systems. In particular, such profiles are used in outdoor applications, so that a certain degree of weather resistance is a prerequisite. Another requirement for composite profiles is that they should be as similar as possible to wood profiles in terms of appearance, haptics and processing. Due to increasing environmental awareness, there is a growing demand for resource-saving use of renewable wood substitute raw materials. It is known to use wood-plastic composites, so-called WPC profiles (Wood Plastic Composite), which can be processed thermoplastically and are manufactured from different proportions of wood, in particular wood flour, plastics as well as additives, whereby mostly modern processes of plastics technology, such as extrusion or injection molding, are used.

The well-known profiles made of wood-plastic composites have, among others, the disadvantage that they cannot be painted or can only be painted with great effort. An additional disadvantage is that the frequently occurring polyethylene content makes the haptics of the profile very plastic-like, making such profiles unsuitable for furniture production.

From EP 2 536 785 a composition for the production of an imitation wood is known, which contains a mixture of PVC resin and rice or peanut shell powder. In the case of such imitation wood products, important physical and/or mechanical parameters have proved to be capable of improvement, in particular flexural strength, which is determined according to DIN ISO 178, impact strength, which is determined according to DIN ISO 179-1eU, and water absorption, which is recorded according to DIN ISO 62, or slip resistance. Furthermore, the demand for resource conservation of regenerative raw materials requires alternatives to the use of rice husks, especially to improve the eco-balance.

From WO 2004/022846 A2, a plastic cellulose fiber composition containing a polymer, cellulose fibers, and a quaternary ammonium salt is known, wherein the quaternary ammonium salt imparts antimicrobial properties to the composition and serves as a lubricant during manufacture. A wide variety of cellulose fibers can be used, including from wood and agricultural waste.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
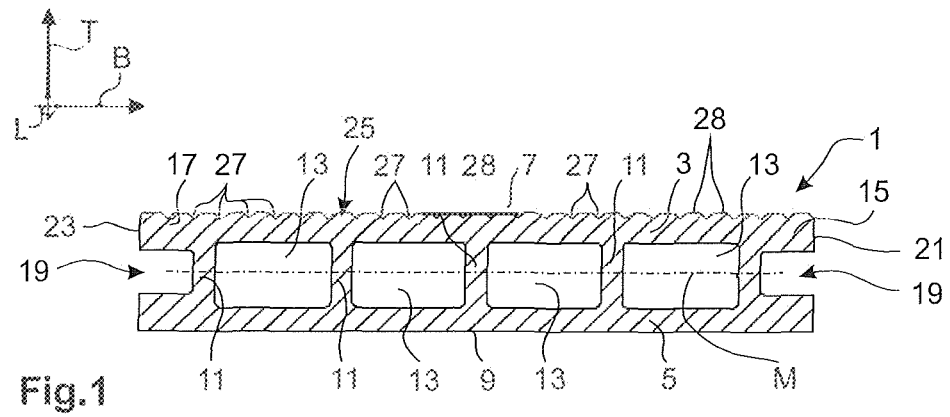
FIG. 1 is a sectional view of an extrusion profile according to an exemplary embodiment of the disclosure.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

It is therefore the task of the disclosure to overcome the disadvantages of the known prior art, in particular to provide a composite material for the production of an extrudate, in particular an imitation wood, for example for wall, floor or fence system profiles, especially in the outdoor sector, which has improved physical and/or mechanical properties, meets the demand for resource conservation of regenerative raw materials and at the same time is as similar as possible to wood in terms of appearance, haptics and processing.

Thereafter, a composite material for producing an extrudate, in particular a wood imitate that can be produced by an extrusion process, is provided. For example, the extrudate, in particular the imitation wood, can be a monoextrusion profile or a multiple extrusion profile, in particular a coextrusion profile. As used herein, a composite material is intended to denote a material made of two or more joined materials. The composite material comprises polyvinyl chloride (PVC), which may be rigid and/or flexible PVC, depending on the type of extrudate to be produced. For example, if the extrudates are used to manufacture door and/or window frame profiles, patio floor profiles or pipes, the rigid PVC is predominantly used. In the case where the extrudate to be produced is to exhibit elastic behavior, such as in cable sheathing, soft PVC is preferred. For example, the PVC may be a PVC resin, in particular a PVC resin suspension. In a preferred embodiment, the PVC is a PVC produced by suspension polymerization, S-PVC.

The composite material further comprises granules of cereal chaff. Granules or granular matter in this context generally refers to materials composed of solid particles of small dimensions. For example, the granules may be in the form of sand, powder or powder. Preferably, grain chaff refers to the components of the respective grain plant that fall off during the threshing of grain. Preferably, the cereal chaff comprises the spelt which protectively surrounds the flower, the hull, granule, seed coat and/or stem parts, and components of the fruit or seed or flower may also be present. As an example, the composite may comprise granulated cereal or granulated cereal chaff, wherein granulation generally relates to a technique in which particles of similar particle sizes are present as a result. According to the disclosure, the cereal chaff is selected from at least one of the genus Pooideae, Panicoideae and Antropogonoideae, respectively. By means of the composite composition according to the disclosure, the physical and/or mechanical properties are improved, while at the same time an extrudate can be produced which is as similar as possible to wood in terms of appearance, haptics and processing, such as an imitation wood. Furthermore, the composite material according to the disclosure ensures resource conservation of regenerative raw materials during its production, in which the life cycle assessment of the extrudate to be produced is improved, since the availability of the cereal species to be used is available in Europe and thus procurement from a non-European market is not required.

The present disclosure also relates to a composition for producing an imitation wood, the composition comprising a mixture of PVC, in particular PVC resin or S-PVC, and granules of cereal chaff, in particular as described above, from at least one of the genus Pooideae, Panicoideae and Antropogonoideae, respectively. A composite material may be formed from the composition, for example by mixing or blending the individual components. By means of the composite material, an imitation wood, i.e. an extrudate, can then be produced by an extrusion step.

For example, the granules may be a ground material. The material may be ground by means of a grain mill. For example, the granules of grain chaff may be ground such that they have a particle size, such as grain size, in the range of 0.05 mm to 1 mm, preferably in the range of 0.1 mm to 0.7 mm, preferably in the range of 0.2 mm to 0.5 mm, and more preferably in the range of 0.25 mm to 0.42 mm. It has been found that by means of the particle size value to be ground, it is possible to strongly influence the physical and mechanical properties of the composite. For example, it was found that with a higher grinding quality, i.e. using a finer screening agent, the water absorption of the composite material to be produced can be reduced. However, it was equally found that too small particle or grain sizes, i.e. in particular smaller than 0.05 mm, 0.1 mm, 0.2 mm or smaller than 0.25 mm, make compounding of the cereal chaff material more difficult. Furthermore, poorer processability was observed because the mixture is too viscous after compounding. Too small a particle size also means that the number of cereal chaff particles per unit volume in the composite increases, which deteriorates the appearance of the extrudate produced from the composite, in particular the appearance increasingly deviates from a wood-like appearance. In addition, it has been found that particle or grain sizes that are too large, in particular larger than 1 mm, 0.7 mm, 0.5 mm or larger than 0.42 mm, can also have a negative effect on the composite extrudate being produced. For example, the flexural/rupture strength may decrease and the subsequent machinability, such as subsequent grinding, may deteriorate. Preferably, cereal husk grain sizes of less than 0.315 mm are used for the most part, in particular 85 to 95%, in the composites according to the disclosure, and preferably cereal husk grain sizes of less than 0.25 mm are used for the most part, in particular 75 to 85%.

In an exemplary embodiment, the cereal is Triticeae and/or Aveneae. In particular, the cereal selected is wheat and/or oats and/or barley, which increasingly improve the life cycle assessment. In particular, the cereal is selected from the wheat monocorn series and/or wheat emmer series and/or wheat spelt series. In an exemplary embodiment, the cereal comprises spelt (*Triticum aestivum* subsp. *spelta*), in particular exclusively spelt.

According to another exemplary embodiment of the composite material according to the disclosure, the proportion of grain chaff in the total weight is between 10 and 50 wt. %. It was found that the water absorption, which is determined according to DIN ISO 62, increases with increasing grain chaff content of grain chaff according to the disclosure in the total weight. It is clear that the requirements for water absorption depend on the particular use of the extrudate to be produced. In particular, for the use of the extrudate in flooring, wall paneling or fencing system profiles, which are used in outdoor applications and thus have to be designed to be weather or weather-resistant, a lower water absorption is advantageous. Preferably, the cereal chaff content relates to 15 to 45 wt. % or 20 to 40 wt. %, more preferably 25 to 35 wt. %.

In a preferred embodiment, the polyvinyl chloride content of the total composite weight is between 30 and 80 wt. %, preferably between 35 and 75 wt. %, in particular between 40 and 70 wt. % or preferably between 30 and 45 wt. %, more preferably between 30 and 40 wt. %.

It is clear that the sum of all present composite components does not exceed 100%.

Preferably, the composite material comprises exclusively polyvinyl chloride and cereal chaff from at least one of the genus Pooideae, Panicoideae and Antropogonoideae, respectively. In an exemplary embodiment of the composite, the composite further comprises at least one additive, which is generally an additive, it being understood that the sum of the composite components adds up to 100 wt. %.

The additives used are, for example:
chemical binders based on thermoplastics,
  such as polymethacrylate, acrylate,
chalk,
titanium dioxide,
color pigments,
  such as soot black, red iron oxide, ocher,
lubricants or lubricating agents,
  such as fatty acid salts, for example calcium stearate, fatty acid esters, fatty acid amides, kerosene waxes, olefin waxes, polyethylene waxes, microcrystalline kerosene, chlorinated polyethylene (CPE),
and
polyvinyl chloride processing aid,
  such as heat and weathering stabilizers, antioxidants, antioxidants, light stabilizers, ultraviolet absorbers or antistatic agents.

For example, the additives can be mixed, in particular hot-mixed, with the composite material, in particular with the polyvinyl chloride.

According to the disclosure, preferably no quaternary ammonium salts are used as additives.

According to a further development, the composite material according to the disclosure comprises chalk, wherein in particular a chalk content is between 1 to 25 wt. %, 2 to 23 wt. % or 3 to 21 wt. % or 20 to 25 wt. %.

Furthermore, the composite may have a lubricant, preferably with a content in the range of 1 to 11 wt. %, 2 to 10 wt. % or 3 to 9 wt. %. Preferably, chlorinated or chlorinated polyethylene (CPE) can be used as a lubricant. More than one lubricant may also be used.

Furthermore, color pigments can be added to the composite material.

In an exemplary further development of the composite material according to the disclosure, the composite material comprises at least one additive, such as chalk, lubricant or color pigment (preferably chalk, lubricant and color pigments), wherein a mixing ratio of cereal chaff to PVC is in the range of 0.2 to 0.85 or 0.2 to 0.9, preferably in the range of 0.35 to 0.8 or in the range of 0.38 to 0.77 or in the range of 0.8 to 0.9. Further, a mixing ratio of additive to polyvinyl chloride may be in the range of 0.05 to 0.5. For example, in the case where chalk is present in the composite, a mixing ratio of chalk to polyvinyl chloride may be in the range of 0.05 to 0.5 or from 0.05 to 0.75, preferably in the range of 0.06 to 0.45 or in the range of 0.07 to 0.4, or in the range of 0.45 to 0.75, for example 0.55 to 0.7. For example, in the case where lubricant(s) are present in the composite, a mixing ratio of lubricant(s) to polyvinyl chloride may be in the range of 0.05 to 0.3, preferably in the range of 0.06 to 0.25 or in the range of 0.07 to 0.2.

According to a further embodiment, the composite material according to the disclosure comprises PVC, cereal chaff and chalk, wherein a preferred mixing ratio of cereal chaff to PVC is in the range of 0.8 to 0.9 and a preferred mixing ratio of chalk to polyvinyl chloride is in the range of 0.55 to 0.7.

In an exemplary embodiment, a composition that can be used to form the composite material of the disclosure, or the composite material of the disclosure, comprises:
S-PVC,
preferably mixed with a calcium/zinc-based stabilizer,
grain chaff,
preferably comprising spelt
and
several additives/additive components,
especially chalk, chlorinated polyethylene (CPE) and other slip agents (such as olefin waxes and esters), titanium dioxide, color pigments (such as red iron oxide, brown/yellow and carbon black), other stabilizers (such as acrylate, THEIC).

For example, a particle or grain size of the additive components, in particular of the additive chalk, can be smaller than 5 μm, in particular smaller than 4 μm. This makes it possible to ensure advantageous compounding of the composite components and advantageous subsequent machinability of the extrudate produced from the composite.

The composites according to the present disclosure and in particular the extrudates made therefrom, which have an improved life cycle assessment due to the local availability of the selected cereals, achieve the physical and/or mechanical composite properties required in the present disclosure and at the same time have the suitability to be used as well as possible for imitation wood products. For example, in accordance with the present disclosure, it was found that the flexural strength of the composite material, in particular of an extrudate made from the composite material, measured according to DIN ISO 178, decreases with an increasing ratio of lubricant and/or chalk and/or cereal chaff of the genus Pooideae, Panicoideae or Antropogonoideae, respectively, to polyvinyl chloride according to the disclosure. Furthermore, it was found that the flexural modulus of elasticity, measured according to DIN ISO 178, increases with an increasing ratio of cereal chaff of the genus Pooideae, Panicoideae or Antropogonoideae or chalk to polyvinyl chloride and, on the other hand, strongly decreases with an increasing ratio of lubricant to polyvinyl chloride. In addition, the value of impact strength, measured according to DIN ISO 179-1eU, strongly decreases with an increasing ratio of cereal chaff to polyvinyl chloride. On the other hand, the value of impact strength increased sharply with increasing ratio of lubricant or chalk to polyvinyl chloride. A further finding relates to the density of the composite, which increases sharply with increasing ratio of chalk to polyvinyl chloride, measured according to DIN ISO 1183. With regard to the characteristic of water absorption, which is particularly important for the use of the composite or the extrudate made from it in the outdoor sector, for example after 24 hours, it was discovered that this increases sharply with increasing ratio of cereal chaff to polyvinyl chloride, measured according to DIN ISO 62.

According to an exemplary further development of the composite material, a stabilizer, which is preferably calcium-zinc based, is admixed to the polyvinyl chloride. In particular, the polyvinyl chloride is hot-blended with the stabilizer, which is preferably calcium-zinc based. In an exemplary embodiment, the admixture of the stabilizer with the polyvinyl chloride occurs prior to mixing with the cereal chaff.

In an exemplary embodiment of the composite material according to the disclosure, the cereal chaff is preferably ground into a granular form, preferably to separate the cereal chaff from the cereal plant. Furthermore, the cereal chaff may be classified by means of a sieve insert having a mesh size, which is a measure of the mesh fineness and consequently also determines the grain size of correspondingly sieved material, of in particular less than 2 mm, preferably 1.5 mm, 1 mm or 0.5 mm, in order to be able to order the cereal chaff according to defined criteria, such as particle size, density and/or inertia. A sieve, or its sieve insert, is generally a device for separating or separating solid materials, such as bulk materials, by particle size. It has been found that as the sieve insert size decreases, i.e., as the particle or grain size decreases, the water absorption of the composite is reduced.

In an exemplary further development of the composite material, the same has a density of less than 2 g/cm$^3$, preferably less than 1.8 g/cm$^3$, 1.6 g/cm$^3$, in particular less than 1.5 g/cm$^3$, 1.45 g/cm$^3$ or less than 1.4 g/cm$^3$. It has been found that the specific composite weight or its density increases with increasing proportion of additives.

According to a further aspect of the present disclosure, which can be combined with the previous aspects, an extrudate is provided that is produced by extrusion of a composite material according to the disclosure. Common extrusion processes, or common extrusion devices, such as a multi-screw extruder, in particular a twin-screw extruder, may be used. For example, the composite material according to the disclosure can be produced by means of the following steps. First, the composite material components to be used, or the raw materials thereof, are to be dried and mixed, for example manually or mechanically, in particular to obtain the composite material compositions according to the disclosure with the proportions of the respective components according to the disclosure. Subsequently, compounding or preparation of the composite material is carried out, if necessary by admixing additives, in particular in order to achieve preferred properties of the composite material, and, if necessary, granulation on an extruder. It is also conceivable to produce the PVC additive mixture by means of dry blending, in particular to generate so-called dry blend. The extrusion strands obtained can be comminuted, for example, by means of a cutting granulator. Extrusion, preferably profile extrusion, for example by means of a twin-screw extruder is used to produce extrudates, such as imitation wood, for example as extrusion profiles, with desired cross-sectional areas, such as 10×4 mm².

In an exemplary embodiment, the extrudate has a flexural modulus of elasticity according to DIN ISO 178 of more than 4,000 N/mm², preferably more than 4,500 N/mm² or more than 5,000 N/mm². In particular, the flexural modulus of elasticity can be less than 15,000 N/mm², especially less than 12,000 N/mm², 11,000 N/mm², 10,000 N/mm², 9,000 N/mm², 8,000 N/mm², 7,000 N/mm² or less than 6,000 N/mm². Furthermore, a flexural strength according to DIN ISO 178 of the extrudate may be more than 50 N/mm², preferably more than 55 N/mm², 60 N/mm², or more than 65 N/mm². Preferably, the flexural strength is less than 100 N/mm², in particular less than 90 N/mm², 80 N/mm², 75 N/mm² or 70 N/mm².

According to a further development of the extrudate according to the disclosure, it has a tensile modulus according to DIN ISO 527 of more than 3,000 N/mm², preferably more than 3,500 N/mm². Preferably, the tensile modulus is less than 10,000 N/mm², in particular less than 9,000 N/mm², 8,000 N/mm², 7,000 N/mm², 6,000 N/mm², 5,000 N/mm² or less than 4,500 N/mm². Furthermore, a tensile strength according to DIN ISO 527 of the extrudate can be more than 30 N/mm², preferably more than 35 N/mm². Preferably, the tensile strength is less than 100 N/mm², in particular less than 90 N/mm², 80 N/mm², 70 N/mm², 60 N/mm², 55 N/mm², 50 N/mm², 45 N/mm² or less than 40 N/mm².

In an exemplary further development of the extrudate according to the disclosure, it has an impact strength, measured according to DIN ISO 179-1eU, of more than 6 kJ/m², preferably more than 6.5 kJ/m², 7 kJ/m², 7.5 kJ/m², 8 kJ/m² or more than 8.5 kJ/m². Preferably, the impact strength is less than 15 N/mm², preferably less than 13 N/mm² or 11 N/mm².

In an exemplary embodiment of the extrudate according to the disclosure, when the extrudate is stored in water, for example for 5 hours, a dimensional change, in particular dimensional enlargement, such as swelling, which can be observed, for example, when carrying out a cooking test according to DIN EN 1087, is less than 0.5% in a longitudinal extension of the extrudate, preferably in the extrusion direction of the extrudate. Furthermore, a dimensional change, preferably dimensional increase, in a width extension direction transverse to the longitudinal extension direction can be less than 0.8%. Furthermore, a dimensional change, in particular dimensional enlargement, in a depth direction transverse to the longitudinal and width direction, which for example defines an extrudate thickness, can be less than 4.5%. Due to these material properties, the extrudates of the disclosure produced by means of the composite material according to the disclosure can be used very well in the outdoor sector, for example for window and/or door profile frames, which must have a certain degree of weather or weathering resistance.

According to a further development of the present disclosure, the extrudate, in particular according to imitation wood, is formed as an extrusion profile. For example, a monoextrusion profile may be provided which has a cereal chaff content in the range from 25 to 50 wt. %, preferably from 30 to 45 wt. %.

Furthermore, a multiple extrusion profile, for example a coextrusion profile, may be provided with a cereal chaff content in the range of 10 to 50 wt. %, preferably in the range of 15 to 45 wt. %.

Furthermore, the present disclosure provides a method for producing a composite material that can be further processed, for example by an extrusion process, to form an imitation wood product. In the process, polyvinyl chloride, in particular PVC resin, is produced and/or provided.

Furthermore, cereal chaff, such as husk, hull, granule, seed coat and/or stalk parts, is produced and/or provided, which can be done, for example, by threshing. The cereal chaff may then be granulated and/or ground, in particular to obtain desired particle sizes. The cereal chaff is thereby selected from at least one of the genus Pooideae, Panicoideae and Antropogonoideae, respectively. Subsequently, the polyvinyl chloride is blended and/or mixed with the cereal chaff. Furthermore, the production process according to the disclosure is characterized in such a way that a composite material according to aspects of the disclosure can be produced therewith. For example, the mixing and/or blending is carried out for a predetermined time, for example at least two minutes, for example a maximum of ten minutes, at a predetermined temperature, for example in the range from 100° C. to 180° C., in particular in the range from 120° to 150°, in particular in the range from 125° C. to 140° C. In an exemplary further embodiment, additives are mixed and terribly or blended with one another, with a time of 10 minutes, for example, resulting in sufficient blending and/or mixing. Subsequently, the additive mixture can be thoroughly mixed together with the PVC cereal chaff mixture, in particular homogeneously, wherein, for example, a high-speed mixer is used, by means of which thorough mixing takes place over a predetermined time, for example at least five to, for example, a maximum of 15 minutes. For example, the resulting mixture can be cooled for a predetermined time, for example 20 minutes to 40 minutes.

According to a further aspect of the present disclosure, which is combinable with the previous aspects, there is provided an extrusion process for producing an extrudate according to the disclosure, such as a wood imitation, wherein the extrudate is produced from a composite material according to the disclosure by means of the extrusion process according to the disclosure. For example, the composite material described above is extruded in a twin or twin-screw extruder at a predetermined temperature, which is generally about 20° K above the melting temperature of the composite material, for example in the range of 100° C. to 300° C., for example in the range of 130° C. to 250° C., in particular in the range of 150° C. to 210° C.

To illustrate the advantages of the composite material according to the disclosure, in particular its physical and mechanical properties, exemplary composites according to the disclosure were prepared and the composite properties were determined by means of tests. Table 1 shows the mixing ratios as well as the concentrations of the mixture components in the respective composite material. In particular, the mixing ratios of husk to polyvinyl chloride, chalk to polyvinyl chloride and lubricant to polyvinyl chloride are given. For the preferred composites, the cereal chaff used was husk material and the additive used was chalk. For example, the spelt material may be spelt. Table 2 again shows a total of 12 exemplary composites, for which the respective concentrations of the blend components are listed, as well as the mechanical properties determined in each case for flexural modulus/elasticity, flexural strength and impact strength. Table 3 differs from Table 2 in that instead of the mechanical properties, the physical properties of the composites are listed, in particular their density, water absorption after 24 hours and after 7 days. Table 4 shows further test results on mechanical and physical properties of extrudates produced by means of the exemplary composites according to the disclosure, which are to be used in particular as covering profiles.

TABLE 1

Mixing ratios and concentrations of the mixture components

| Example | Spelt/PVC | Chalk/PVC | Lubricant/PVC | PVC % | Spelt % | Chalk % | Lubricant % |
|---|---|---|---|---|---|---|---|
| 1 | 0.381 | 0.076 | 0.076 | 65.2 | 24.8 | 5.0 | 5.0 |
| 2 | 0.762 | 0.076 | 0.076 | 52.2 | 39.8 | 4.0 | 4.0 |
| 3 | 0.381 | 0.381 | 0.076 | 54.4 | 20.7 | 20.7 | 4.1 |
| 4 | 0.762 | 0.381 | 0.076 | 45.1 | 34.3 | 17.2 | 3.4 |
| 5 | 0.381 | 0.076 | 0.133 | 62.9 | 24.0 | 4.8 | 8.4 |
| 6 | 0.762 | 0.076 | 0.133 | 50.7 | 38.6 | 3.9 | 6.8 |
| 7 | 0.381 | 0.381 | 0.133 | 52.8 | 20.1 | 20.1 | 7.0 |
| 8 | 0.762 | 0.381 | 0.133 | 43.9 | 33.5 | 16.7 | 5.9 |
| 9 | 0.571 | 0.229 | 0.105 | 52.5 | 30.0 | 12.0 | 5.5 |
| 10 | 0.571 | 0.229 | 0.105 | 52.5 | 30.0 | 12.0 | 5.5 |
| 11 | 0.571 | 0.229 | 0.105 | 52.5 | 30.0 | 12.0 | 5.5 |
| 12 | 0.571 | 0.229 | 0.105 | 52.5 | 30.0 | 12.0 | 5.5 |

TABLE 2

Concentrations of compound components and mechanical properties

| Example | PVC % | Spelt % | Chalk % | Lubricant % | Flexural/elastic modulus MPa | Bending strength MPa | Impact strength kJ/m$^2$ |
|---|---|---|---|---|---|---|---|
| 1 | 65.2 | 24.8 | 5.0 | 5.0 | 4000 | 68.5 | 12.0 |
| 2 | 52.2 | 39.8 | 4.0 | 4.0 | 5190 | 66.4 | 8.5 |
| 3 | 54.4 | 20.7 | 20.7 | 4.1 | 4590 | 66.4 | 12.8 |
| 4 | 45.1 | 34.3 | 17.2 | 3.4 | 5520 | 67.4 | 9.7 |
| 5 | 62.9 | 24.0 | 4.8 | 8.4 | 3710 | 67.7 | 14.4 |
| 6 | 50.7 | 38.6 | 3.9 | 6.8 | 4770 | 63.3 | 9.4 |
| 7 | 52.8 | 20.1 | 20.1 | 7.0 | 4140 | 60.3 | 14.5 |
| 8 | 43.9 | 33.5 | 16.7 | 5.9 | 5020 | 60.3 | 9.4 |
| 9 | 52.5 | 30.0 | 12.0 | 5.5 | 4740 | 65.9 | 10.7 |
| 10 | 52.5 | 30.0 | 12.0 | 5.5 | 4750 | 66.1 | 10.8 |
| 11 | 52.5 | 30.0 | 12.0 | 5.5 | 4730 | 65.6 | 10.7 |
| 12 | 52.5 | 30.0 | 12.0 | 5.5 | 4650 | 65.2 | 10.5 |

TABLE 3

Concentrations of the mixture components and physical properties

| Example | PVC % | Spelt % | Chalk % | Lubricant % | Density g/cm$^3$ | 24 h % | 7 d % |
|---|---|---|---|---|---|---|---|
| 1 | 65.2 | 24.8 | 5.0 | 5.0 | 1.3927 | 0.38 | 0.99 |
| 2 | 52.2 | 39.8 | 4.0 | 4.0 | 1.3972 | 0.98 | 2.52 |
| 3 | 54.4 | 20.7 | 20.7 | 4.1 | 1.5080 | 0.37 | 0.91 |
| 4 | 45.1 | 34.3 | 17.2 | 3.4 | 1.4855 | 0.73 | 2.07 |
| 5 | 62.9 | 24.0 | 4.8 | 8.4 | 1.3652 | 0.40 | 1.00 |
| 6 | 50.7 | 38.6 | 3.9 | 6.8 | 1.3980 | 0.88 | 2.25 |
| 7 | 52.8 | 20.1 | 20.1 | 7.0 | 1.4850 | 0.34 | 0.86 |
| 8 | 43.9 | 33.5 | 16.7 | 5.9 | 1.4694 | 0.85 | 2.13 |
| 9 | 52.5 | 30.0 | 12.0 | 5.5 | 1.4466 | 0.60 | 1.47 |
| 10 | 52.5 | 30.0 | 12.0 | 5.5 | 1.4479 | 0.53 | 1.37 |
| 11 | 52.5 | 30.0 | 12.0 | 5.5 | 1.4388 | 0.57 | 1.56 |
| 12 | 52.5 | 30.0 | 12.0 | 5.5 | 1.4459 | 0.47 | 1.44 |

From the exemplary composite compositions according to the disclosure shown above in Tables 1 to 3, the mechanical and physical properties as well as values with respect to water absorption of a composite or extrudate according to the disclosure, which is produced from the respective composite material according to the disclosure, are evident. For example, it can be seen that a flexural strength of 60.3 MPa to 68.5 MPa was achieved in the illustrated extrudates according to the disclosure. The flexural modulus of elasticity in the present test results is in the range of 4,000 MPa to 4,520 MPa. Values in the range of 8.5 kJ/mm$^2$ to 14.5 kJ/mm$^2$ were determined as impact strength. The density of the respective extrudate or the associated composite was in the range of 1.365 to 1.508 g/cm$^3$. Water absorption values of always less than 1%, in particular in the range of 0.34 to 0.98%, were obtained during water storage for 24 hours according to DIN ISO 62. Furthermore, the water absorption after 7 days of water storage according to DIN ISO 62 was less than 3%, in particular in the range of 0.86 to 2.52%.

In the following Table 4, characteristic material values for the flexural modulus of elasticity, flexural strength, elongation at flexural strength, impact strength, density and water absorption after 24 hours of water storage and after seven days of water storage are listed for test examples of extrudates according to the disclosure, which are, for example, imitations of wood and produced by means of a composite material according to the disclosure. Table 4 shows in particular the correlations between the grain husk quality of the composite material according to the disclosure, i.e. the grain size of the grain husk material used or the sieve size with which the grain husks are ground, and the material properties. As is evident, the presence of additives, such as color pigments, does not have a negative effect on the mechanical or physical properties of the extrudate produced from the composite material according to the disclosure.

TABLE 5-continued

| Component | Product group | Share [wt. %] |
|---|---|---|
| CPE | Additive | 3 to 9, preferred 3-5 |
| Acrylic | Additive | 0.5 to 5, preferred 1-4 |
| Calcium/zinc-based stabilizer | Additive - stabilizer | 0.5 to 5, preferred 0.5-1.5 |
| THEIC | Additive - co-stabilizer | 0.01 to 0.1, Preferred 0.01 to 0.05 |
| Phenolic antioxidant | Additive - co-stabilizer | 0.01 to 0.1, Preferred 0.01 to 0.05 |
| Olefin waxes | Additive - lubricant | 0.1 to 1, preferred 0.1-0.5 |
| Ester | Additive - lubricant | 0.1 to 1, preferred 0.3-0.8 |

TABLE 4

Test examples with different grain husk qualities and material properties

| Test examples | Flexural modulus of elasticity | | Flexural strength | | Elongation at flexural strength | | Impact strength | | Density | | Water absorption 24 h | | Water absorption 72 h | |
|---|---|---|---|---|---|---|---|---|---|---|---|---|---|---|
| | $E_f$ MPa | Std MPa | $s_{fM}$ MPa | Std MPa | $e_{fM}$ [%] | hours % | $a_{cU}$ [kJ/m$^2$] | hours [kJ/m$^2$] | r [g/cm$^3$] | hours [g/cm$^3$] | 24 h [%] | hours % | 7 d [%] | hours % |
| Spelt 2 mm ground | 4470 | 117 | 59.40 | 1.56 | 2.00 | 0.10 | 7.59 | 1.12 | 1.4252 | 0.0077 | 0.97 | 0.12 | 2.11 | 0.14 |
| Spelt 1 mm ground | 5410 | 105 | 62.10 | 1.63 | 1.70 | 0.10 | 5.70 | 0.26 | 1.4858 | 0.0044 | 1.15 | 0.03 | 2.50 | 0.06 |
| 45% spelt 1 mm ground | 5340 | 80 | 56.00 | 1.24 | 1.40 | 0.06 | 6.10 | 1.02 | 1.4262 | 0.0025 | 1.92 | 0.04 | 4.63 | 0.14 |
| Spelt 1 mm ground plus brown pigment | 5300 | 87 | 61.00 | 1.07 | 1.60 | 0.07 | 6.71 | 1.01 | 1.4849 | 0.0045 | 1.14 | 0.07 | 2.59 | 0.08 |
| Spelt 0.5 mm ground plus brown pigment | 5410 | 188 | 64.60 | 0.96 | 1.60 | 0.05 | 7.55 | 1.14 | 1.4964 | 0.0041 | 0.75 | 0.12 | 1.99 | 0.14 |

In the following, an exemplary composition is described that can be used to form the composite material of the disclosure. This composition has the following components:

| | |
|---|---|
| S-PVC | |
| Calcium/zinc-based stabilizer, | |
| Grain chaff | preferably comprising spelt or exclusively comprising spelt |
| Chalk | e.g. PolyPlex 1 (CALCIT d.o.o), chlorinated polyethylene (CPE) |
| Acrylat | z.B. Paraloid ™ K-125 ER (Dow Chemical Company) |
| Lubricants | Olefin waxes and esters e.g. Licowax ® PE 520 powder (Clariant), Licowax ® E powder (Clariant), LIGALUB 9 GE-H (Peter Greven), |
| Titanium dioxide | |
| Color pigments | Brown/yellow, red iron oxide, carbon black |
| Further stabilizers | THEIC (trishydroxyethyl isocyanurate), phenolic antioxidant (e.g. Irganox ® 1076 (BASF). |

TABLE 5

| Component | Product group | Share [wt. %] |
|---|---|---|
| S-PVC | PVC | 30 to 45, preferred 30-40 |
| Grain chaff, spelt comprehensive | Grain chaff/filler | 20 to 40, preferred 20-35 |
| Chalk | Additive | 1 to 25, preferred 20-25 |

TABLE 5-continued

| Component | Product group | Share [wt. %] |
|---|---|---|
| Titanium dioxide | Additive | 0.01 to 0.1, Preferred 0.01 to 0.05 |
| Carbon black | Additive - color pigment | 0.01 to 0.1, preferred 0.01-0.05 |
| Red iron oxide | Additive - color pigment | 0.05 to 0.6, preferred 0.15-0.5 |
| Brown/yellow fine granules | Additive - color pigment | 0.1 to 5, preferred 0.5-1.5 |

As has already been written, the composite material according to the disclosure enables particularly advantageous mechanical as well as physical characteristic values, which are superior to those of previously known composite materials for profiles for floor or wall paneling or fencing systems, especially in the outdoor sector. The mechanical characteristic values, such as flexural modulus of elasticity, strength and impact resistance, tend to increase with finer ground grain husk, while water absorption tends to decrease. Elongation values tend to decrease with finer milled grain husk, while measured density values tend to increase.

Figure 2:
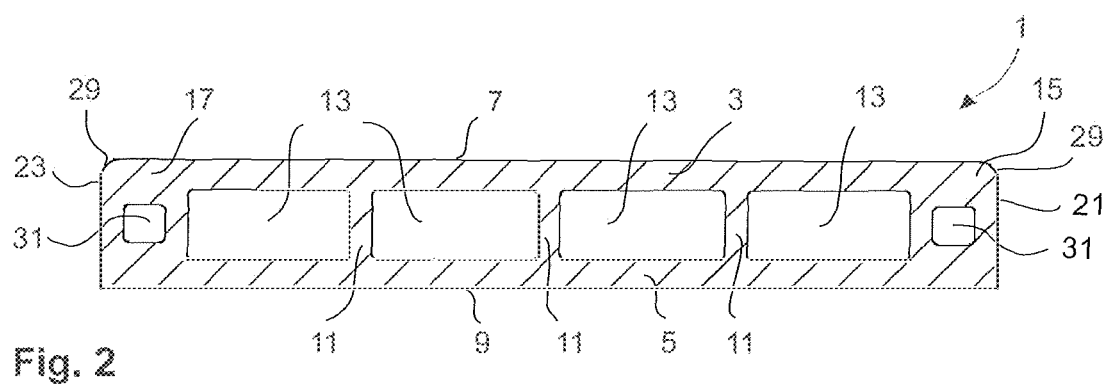
FIG. 2 is a sectional view of an extrusion profile according to an exemplary embodiment of the disclosure.
Figure 3:
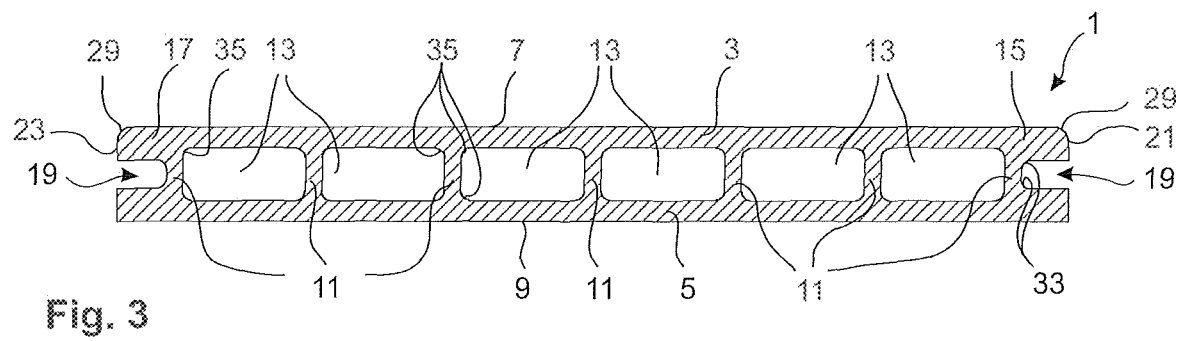
FIG. 3 is a sectional view of an extrusion profile according to an exemplary embodiment of the disclosure.

In the following description of exemplary embodiments of an extrudate according to the disclosure, which is produced from a composite material according to the disclosure by means of an extrusion process according to the disclosure, the extrudate is generally provided with the reference numeral 1. The extrudates shown are, for example, extrusion profiles which are produced by means of a twin-screw extruder. Preferably, such extrusion profiles are used in the outdoor sector, for example for terrace floors, window or door frames. It shall be clear that the extrusion profiles can have any dimensions and any shapes, in particular cross-sectional areas, taking into account the general conditions of the respective extrusion process and the composite material used in each case. The extrusion profile examples according to FIGS. 1 to 3 are shown in sectional view, wherein a longitudinal extension direction L is to be equated with a manufacturing process-related extrusion direction and is oriented in the drawing plane in FIGS. 1 to 3. In a width extension direction B transverse to the longitudinal extension direction L, the exemplary embodiments of the extrusion profiles have width dimensions in the range from 100 mm to 250 mm, with, for example, the extrusion profile illustrated in FIG. 1 having a width of 125 mm, in FIG. 2 of 140 mm and in FIG. 3 of 200 mm. In a depth direction T transverse to the longitudinal direction L and to the width extension direction B, the exemplary extrusion profiles, in particular facade profiles, have depth or height dimensions in the range from 5 mm to 25 mm, where floor profiles, for example, can have dimensions in the range from 15 mm to 25 mm. The extrusion profile shown in FIG. 1, for example, has a depth of about 22 mm, and the extrusion profiles shown in FIGS. 2 and 3, for example, have a depth of about 20 mm.

The extrusion profile 1, which may be a monoextrusion profile, for example, has a substantially sectional double-T-shaped cross-section. In the width direction B, two spaced apart profile plates 3, 5 extend with substantially constant cross-sectional areas. For example, one of the profile plates 3, 5 forms an extrusion profile upper side 7 and the other of the two profile plates 5, 3 forms an extrusion profile lower side 9. Connecting the two profile plates 3, 5 to one another, profile webs 11 are provided which are formed in the longitudinal extension direction L, preferably along the entire extension of the extrusion profile 1. The profile webs are thin-walled and have material thicknesses in the range from 2 to 5 mm. The profile webs 11 are arranged at a regular distance from one another in the width extension direction B of the extrusion profile 1, each two adjacent profile webs 11 together with the profile plates 3, 5 in particular delimiting congruent free spaces 13. The free spaces 13 can be provided, for example, for weight reduction and/or for material savings. Furthermore, stiffening elements may be introduced into the free spaces 13, for example, in order to increase the stability of the extrusion profile 1. In the embodiment shown in FIG. 1, four such free spaces 13 are arranged next to each other. At the distal end sections 15, 17 considered in the width direction B, the profile plates 3, 5 have a greater profile depth than in the profile plate region extending between the end sections 15, 17. On the longitudinal sides 21, 23, the extrusion profile has an exemplary rectangular recess 19, which can, however, also be round, circular or oval. Projections of a further extrusion profile, which are of complementary shape, can be inserted into the recess 19, for example, in order to connect at least two extrusion profiles 1 to one another. Alternatively or additionally, the recess can also be used as a sealing receptacle for sealing elements (not shown). The exemplary extrusion profile 1 is substantially symmetrical with respect to a central axis M. The profile plate 3 arranged on the upper side 7 differs from the profile plate 5 arranged on the lower side 9 by a surface profiling 25 which is formed on the extrusion profile 1 substantially along the entire width and/or longitudinal extension direction B, L. The surface profiling 25 is formed on the extrusion profile 1 substantially along the entire width and/or longitudinal extension direction B, L. The surface profiling 25 is formed on the upper side 7. According to FIG. 1, the profiling 25 is formed by a plurality of longitudinal notches 27 arranged at a distance from one another, for example V-shaped in cross-section, which are formed in particular substantially along the entire longitudinal extent of the extrusion profile 1. Between each two adjacent longitudinal notches 27, surface sections 28 form the surface, or the upper side 7, of the extrusion profile 1. For example, the surface sections 28 also extend substantially along the entire longitudinal extension of the extrusion profile 1.

The exemplary extrusion profile 1 shown in FIG. 2 differs from the extrusion profile 1 shown in FIG. 1 on the one hand in that it has a greater width extension of, for example, 140 mm. Furthermore, the height in depth direction T is somewhat lower and is, for example, 20 mm. In the embodiment example according to FIG. 2, no profiling 25 is provided either on the upper side 7 or on the lower side 9, although this would also be possible. On the upper side 7, the profiled panel 3 merges into the respective end face 21, 23 via a rounded end 29. Furthermore, the extrusion profile 1 illustrated in FIG. 2 differs from that illustrated in FIG. 1 in that no recesses 19 are provided which are accessible from the outside as viewed in the width direction B, but instead a free space 31 of smaller dimensions relative to the free spaces 13 is arranged in each of the respective end sections 15, 17. The rounded end 29 can be formed, for example, by means of a radius in the range from 2 to 5 mm, preferably 3 mm.

The exemplary extrusion profile 1 shown in FIG. 3 differs from the extrusion profile 1 shown in FIG. 1 in that the width in the width direction B is larger and is approximately 200 mm and the depth in the depth direction T is somewhat smaller and is approximately 20 mm. On the other hand, the extrusion profile 1 according to FIG. 3 has six free spaces 13 arranged at a distance from one another, each delimited by two profile webs 11, which are somewhat more elongated than the free spaces 13 according to FIG. 1, i.e. they have relatively larger dimensions in the width direction B than in the depth direction T. At the respective transitions between a profile web 11 and the profile plate 3 or 5, the free spaces 13 have curves 35 which can be realized, for example, by means of radii in the range from 2 to 5 mm. The recesses 19 provided on the longitudinal sides 21, 23 also have roundings 33 on the inside, which can also be realized, for example, by means of a radius in the range from 2 to 5 mm.

The features disclosed in the foregoing description, the figures and the claims may be of importance both individually and in any combination for the realization of the disclosure in the various embodiments.

LIST OF REFERENCE SIGNS 1 extrudate
3, 5 profile plate
7 upper side
9 lower side
11 profile bar
13 free space
15, 17 end section
19 recess
21, 23 longitudinal side
25 profiling
27 longitudinal notch
28 surface section
29, 33, 35 rounding
31 free space
M centerline
L longitudinal extension direction
B width extension direction
T depth extension direction

The invention claimed is:

1. A composite material for producing an extrudate, comprising:
   polyvinyl chloride;
   chlorinated polyethylene; and
   granules of cereal chaff formed from a ground material or stock, the granules of cereal chaff being ground such that the granules of cereal chaff have a particle or grain size in a range of 0.05 mm to 1 mm, the granules comprising spelt.

2. The composite material according to claim 1, wherein the composite material comprises:
   from 10 to 50 wt. % of the granules of cereal chaff; and
   from 30 to 80 wt. % polyvinyl chloride, wherein the sum of the proportions being not more than 100 wt. %.

3. The composite material according to claim 1, wherein the composite material further comprises:
   1 to 25 wt. % of chalk, or
   one or more color pigments.

4. The composite material according to claim 1, wherein:
   the composite material further comprises at least one additive, including chalk, and/or one or more color pigments,
   a mixing ratio of the granules of cereal chaff to polyvinyl chloride is in the range of 0.8 to 0.9,
   a mixing ratio of the chalk or the one or more color pigments to polyvinyl chloride is in the range of 0.55 to 0.7, or
   a mixing ratio of the chlorinated polyethylene to polyvinyl chloride is in the range of 0.07 to 0.2.

5. The composite material according to claim 1, wherein:
   the polyvinyl chloride is prepared by suspension polymerization (S-PVC), and/or a stabilizer is hot-mixed with the polyvinyl chloride.

6. The composite material according to claim 1, wherein the cereal chaff is ground and classified by means of a sieve insert with a mesh size of less than 2 mm, wherein, with decreasing sieve insert size, a water absorption of the composite material is reduced.

7. The composite material according to claim 1, wherein a density of the composite material is 1.6 g/cm$^3$ or less.

8. The composite material according to claim 1, wherein the chlorinated polyethylene is an impact strength enhancer for the extrudate produced from the composite material.

9. The composite material according to claim 1, wherein the chlorinated polyethylene is a lubricant.

10. The composite material according to claim 2, wherein the chlorinated polyethylene is 1 to 11 wt. % of the composite material.

11. An extrudate produced by extrusion of a composite material according to claim 1.

12. The extrudate according to claim 11, wherein the extrudate has a flexural modulus of elasticity of more than 4,000 N/mm$^2$, and/or a flexural strength of more than 50 N/mm$^2$.

13. The extrudate according to claim 11, wherein the extrudate has a tensile modulus of more than 3,000 N/mm$^2$, and/or a tensile strength of more than 30 N/mm$^2$.

14. The extrudate according claim 11, wherein the extrudate has an impact strength of more than 6 KJ/m$^2$.

15. The extrudate according to claim 11, wherein the extrudate has a water absorption, after 24 hours of water storage, of less than 1.0%.

16. The extrudate according to claim 11, wherein, during water storage, a dimensional enlargement, in a longitudinal extension direction of the extrudate, is less than 0.5%, in a width extension direction transverse to the longitudinal direction is less than 0.8%, and/or in a depth extension direction transverse to the longitudinal and width extension directions, is less than 4.5%.

17. A monoextrusion profile of an extrudate produced by extrusion of a composite material according to claim 1, wherein the monoextrusion profile has a cereal chaff content in the range of from 25 to 50 wt. %.

18. A coextrusion profile of an extrudate produced by extrusion of a composite material according to claim 1, wherein a cereal chaff content of the cereal chaff is in the range from 15 to 45 wt. %.

19. An extrusion process for producing an extrudate, comprising:
   providing a cereal chaff comprising spelt;
   grinding the cereal chaff to form granules of the cereal chaff having a particle or grain size in a range of 0.05 mm to 1 mm;
   providing a composite material that includes: polyvinyl chloride, chlorinated polyethylene, and the granules of cereal chaff; and
   extruding the composite material to produce the extrudate.

* * * * *